(12) United States Patent
Wilson et al.

(10) Patent No.: US 7,223,067 B2
(45) Date of Patent: May 29, 2007

(54) FLOW MACHINE WITH A CERAMIC ABRADABLE

(75) Inventors: Scott Wilson, Winterthur (CH); Andreas Franz-Josef Kaiser, Roskilde (DK)

(73) Assignee: Sulzer Metco (US) Inc., Westbury, NY (US)

( * ) Notice: Subject to any disclaimer, the term of this patent is extended or adjusted under 35 U.S.C. 154(b) by 256 days.

(21) Appl. No.: 11/015,144

(22) Filed: Dec. 16, 2004

(65) Prior Publication Data

US 2005/0196271 A1  Sep. 8, 2005

(30) Foreign Application Priority Data

Dec. 17, 2003 (EP) .................................. 03405900

(51) Int. Cl.
*F01D 11/08* (2006.01)
(52) U.S. Cl. ................. 415/173.4; 415/174.4; 428/403
(58) Field of Classification Search ............ 415/173.1, 415/173.4, 174.4, 215.1; 427/217, 215, 376.2, 427/422, 427; 428/403, 404, 701; 106/286.5
See application file for complete search history.

(56) References Cited

U.S. PATENT DOCUMENTS 4,927,714 A * 5/1990 Priceman .................... 428/628
5,543,130 A * 8/1996 Tsuno et al. ................ 428/623
5,932,356 A * 8/1999 Sileo et al. ................. 428/457

FOREIGN PATENT DOCUMENTS

| DE | 10200803 A1 | 7/2003 |
|---|---|---|
| EP | 0425827 A2 | 10/1990 |
| SU | 19884631005 | 11/1988 |

* cited by examiner

*Primary Examiner*—Edward K. Look
*Assistant Examiner*—Devin Hanan
(74) *Attorney, Agent, or Firm*—Townsend and Townsend and Crew LLP

(57) ABSTRACT

The flow machine is furnished with an abradable (10) made of a particle composite material. This so-called composite (1) contains granular core particles (2) of a ceramic material. The surfaces (20) of the granular core particles carry functional layers (22) which form an intermediate phase of the composite which is stable at a high operating temperature. The intermediate phase in this process has been produced in situ at least in part by a chemical reaction of a precursor material (22') and material (21) of the granular core particles on the particle surfaces (20). Bonds (23) are formed between the granular core particles arranged in a porous composite by the intermediate phase. These bonds have a breaking characteristic for abradables.

13 Claims, 1 Drawing Sheet

FLOW MACHINE WITH A CERAMIC ABRADABLE

BACKGROUND OF THE INVENTION

The invention relates to a flow machine with a ceramic abradable and to a method for the manufacture of materials which can be used for the abradable.

With flow machines such as airplane engines, stationary gas turbines, turbocompressors and pumps, it is necessary for a high efficiency for a sealing gap or clearance between vane tips and housing at the periphery of a rotor bearing runner vanes to be very narrow during operation. By using an abradable on the inner surface of the housing over which the tips of the runner vanes move, it is possible to produce a minimum clearance without the runner vanes being damaged in the process. The abradables must be made of ceramic material for high operating temperatures lying above 800° C. This can be applied by means of thermal spraying process, flame spraying or atmospheric plasma spraying (APS). Porosity, and so friability, of the abradable can be produced by mixing a phase which can be burned out (polymer powder) to a ceramic spray powder. Fine particles from the surface of the abradable are released by the vane tips of the rotating rotor due to this friability.

Abradables are known from EP-A-1 111 195 and EP-A-0 935 009 which are known as structured surfaces. Ceramic abradables with non-structured surfaces are also used. The vane tips usually have to be armored in these so that they are not damaged during abrasion. (Armoring can be produced, for example, by laser remelting with the simultaneous addition of hard particles.) Released abrasion particles must be able to escape from the clearance without any significant resistance. Armoring of the vane tips can be omitted with an abradable having a suitably structured surface, since abrasion particles escape from the clearance without any damaging effect.

SUMMARY OF THE INVENTION

It is an object of the present invention to provide a flow machine with a ceramic abradable for high operating temperatures of approximately 1200° C. with which no structuring of the surface has to be present for the abradable, on the one hand, and for which armoring of the vane tips is not necessary, where possible, on the other hand.

The flow machine is furnished with an abradable made of a particle composite material. This so-called composite contains granular core particles of a ceramic material. The surfaces of the granular core particles carry functional layers which form an intermediate phase of the composite which is stable at a high operating temperature. The intermediate phase in this process has been produced in situ at least in part by a chemical reaction of a precursor material and material of the granular core particles on the particle surfaces. Compounds are formed between the granular core particles arranged in a porous composite by the intermediate phase. These compounds have a breaking characteristic for abradables.

High operating temperatures can result in transformations which compact the structure and which can also be observed in ceramic thermal barrier coatings (TBC). By embedding materials in the structure which have an inhibiting effect on a sintering activity, it is possible to maintain porosity. The porosity improves the thermal barrier in TBCs. The friability is maintained in the abradables due to the porosity. Materials which inhibit sintering and are suitable for TBC, such as pyrochlore compounds (see DE-A-102 00 803), can therefore be used.

BRIEF DESCRIPTION OF THE DRAWINGS

The invention will be explained in the following with reference to the drawings.

DESCRIPTION OF THE PREFERRED EMBODIMENTS

Figure 1:
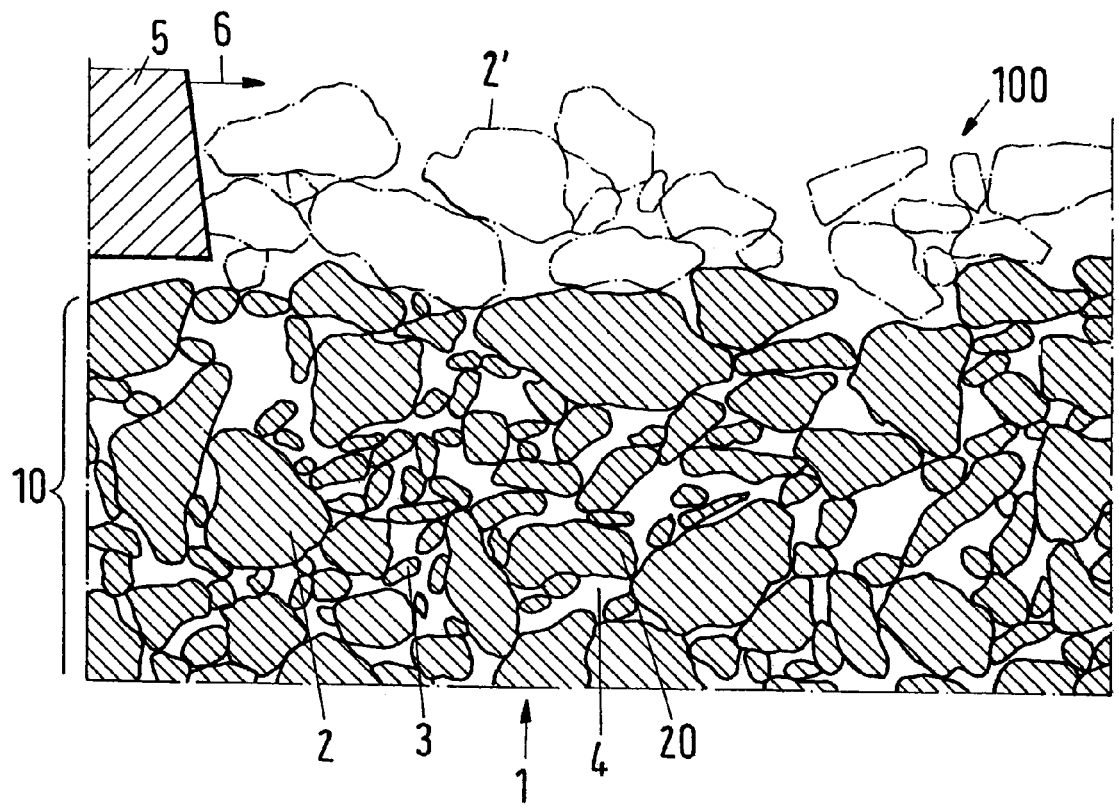
FIG. 1 shows, in section, an abradable of a flow machine in accordance with the invention with a vane tip moved over the coating.

The abradable 10 shown sectionally in the two Figures consists of a particle composite material 1 which is termed a composite 1 in brief. This composite 1 contains granular core particles 2 of a ceramic material 21. Grinding grains, for example made from a synthetic corundum, can be used as granular core particles 2, with these grinding grains being larger than 50 and smaller than 200 μm and preferably having mean diameters with values in the range from approximately 90 to 130 μm. The surfaces 20 of the granular core particles 2 carry functional layers 22 which form an intermediate phase of the composite 1 which is stable at a high operating temperature. The intermediate phase in this process has been produced in situ at least in part by a chemical reaction of a precursor material 22' and material 21 of the granular core particles 2 on the particle surfaces 20.

Compounds 23 are formed between the granular core particles 2 arranged in a porous composite (pores 4) by the intermediate phase; these compounds have a breaking characteristic for abradables. If a vane tip 5, which is moved in the direction of the arrow 6, is moved over the abradable in a grazing manner, granular core particles 2' are broken off from the surface 100, with a peeling of a rim zone (particle 2' drawn in chain dotting) as a rule taking place over a plurality of sweeps.

The ceramic material 21 of the granular core particles 2 largely consists, in an advantageous embodiment, of aluminum oxide $Al_2O_3$ (corundum) and the layers 22 of a spinel $MeAl_2O_4$—where Me=Ni, Mg, Mn or La. It is sufficient if, at least in one layer (not shown) on the surface 20, aluminum oxide $Al_2O_3$ is contained as the main component—more than 50 volume percent. The intermediate phase formed by the spinel has been produced in situ on the particle surfaces 20 by the precursor material 22', which is an oxide of the metal Me, and by aluminum oxide. The spinel is a material which inhibits sintering. It therefore forms an intermediate phase of the composite 1 which is stable at a high operating temperature.

Other materials inhibiting sintering such as are known from the TBCs can also be used instead of the spinel. The pyrochlore compounds have already been named above (DE-A-102 00 803). One pyrochlore compound is, for example, lanthanum zirconate $La_2Zr_2O_7$, a ceramic material with a pyrochlore structure (see also U.S. Pat. No. 6,117,560). The pyrochlore structure is specifically given by the formula $A_2B_2O_7$, where A and B are elements which are present in a cationic form $A^{n+}$ or $B^{m+}$ and to whose charges n+ and m+ the value pairs (n, m)=(3, 4) or (2, 5) apply. The formula for the pyrochlore structure is more generally $A_{2-x}B_{2+x}O_{7-y}$, where x and y are positive numbers which are small in comparison with 1. The following elements can be chosen for A and B:

A=La, Ce, Pr, Nd, Sm, Eu, Gd, Tb, Dy, Ho, Er, Tm, Yb or a mixture of these chemical elements and B=Zr, Hf, Ti.

The granular core particles 2 are advantageously coated with the precursor material 22' by means of a so-called "aerocoating process". In this method, the particles 2 are fluidized and sucked in by an air flow through an annular clearance at the base of a combining tube, with them being conveyed through the tube against gravitational force into a large chamber from which they again drop back into a fluidization zone. The particles 2 move out of this zone back into the combining tube into which a suspension of the coating material 22' is additionally sprayed as very fine droplets by means of a spray nozzle. The droplets are deposited on the particles 2 in a mixing in the combining tube. The coated particles 2 dry during the flight through the large chamber. The air which brings about a conveying and drying of the particles 2 is allowed to escape at the head of the chamber separately from the treated particles 2. The latter can run through the described coating process a plurality of times. As a rule, it cannot be avoided that some of the particles 2 ball together to form agglomerates during coating. Such agglomerates are advantageously removed, for example, by screening. The US corporation Aeromatic-Fielder Division Niro, Inc. sells apparatuses with which the "aerocoating method" can be carried out.

Multi-layer coatings can also be applied using the "aerocoating method" with individual layers which consist of different materials. For example, a granular core particle 2, which does not consist of aluminum oxide, or which does not contain such, can thus have a first layer of this material applied to it. This granular core particle 2 coated in this manner then has a material property required for the method in accordance with the invention. The core material of such a heterogeneous granular core particle 2 naturally has to have a thermal stability required with respect to the operating temperature.

The intermediate phase can also be made from a mixture of precursor material 22' and ceramic material 21, with the precursor material 22' and the ceramic material 21, in particular aluminum oxide, consisting of fine-grain particles whose diameters are smaller than 1 μm. This coating material is prepared together with water and auxiliary materials to form the suspension required for the "aerocoating method". The additional aluminum oxide is suitable for an accelerated function of the spinel. At the same time, the bonds between the granular core particles 2 are also improved by the additional aluminum oxide.

Figure 2:
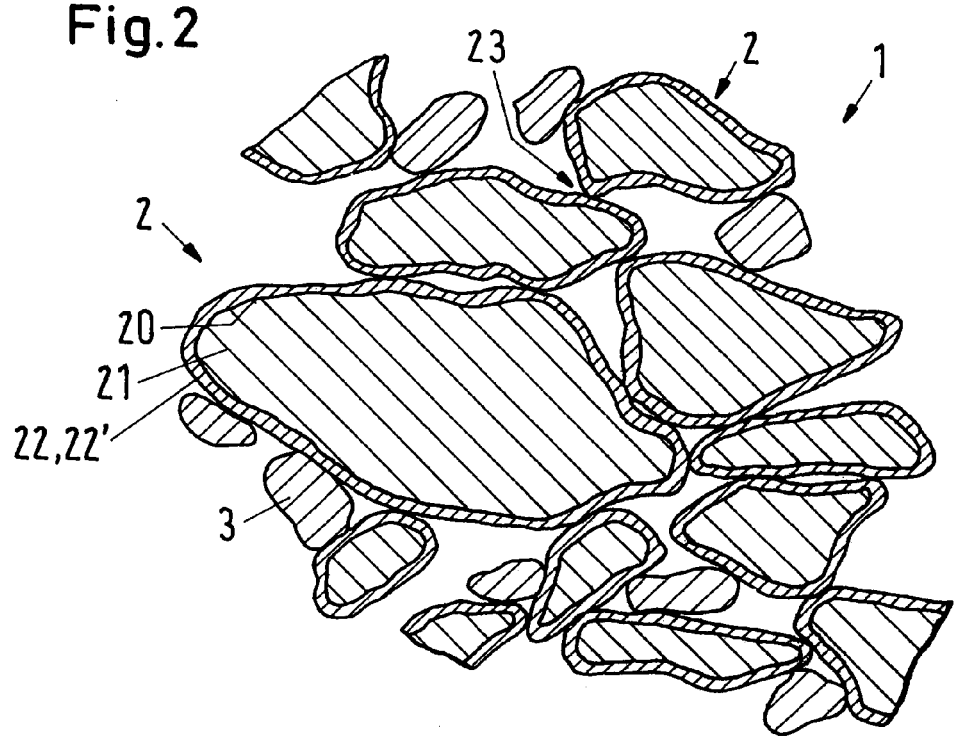
FIG. 2 is an illustration of the porous structure of the abradable.

As shown in FIG. 2, uncoated particles 3 can also be embedded in the composite 1. If aluminum oxide is likewise selected for the material of the particles 3 in the case of the pairing of aluminum oxide with spinel, these particles 3 contribute to improved bonds 23 between the granular core particles 2.

The material for the abradable used in a flow machine in accordance with the invention is produced in steps. The method steps are, for example:

a) production of an atomizable or sprayable mixture in the form of a slip or of a suspension in which fine-grain particles of the precursor material 22' are dispersed;

b) coating of the granular core particles 2 by application of the mixture and subsequent drying of the particles 2;

c) calcining the coated granular core particles 2 at a temperature at which the intermediate phase is formed in situ at the surfaces from precursor material 22' and material of the granular core particle 21 (and, in addition, auxiliary substances of the suspension are thermally eliminated); and d) sintering of the calcined granular core particles 2, in particular at a temperature between 1200 and 1500° C. when NiO is used for the manufacture of spinel, with the sintering being able to take place at and/or after a thermal spraying of the abradable.

In step a), the fine-grain particles can be produced mixed with a solvent, preferably water, while using a mill, in particular an agitating ball mill. The very fine particles are kept dispersed in the solvent without any formation of agglomerates. These very fine particles must be sufficiently small so that the granular core particles 2 (size 40–120 μm) can still be coated effectively. Moreover, the very fine particles should be sinter-active in the subsequent calcination step, i.e. should permit a bonding of the coating to the material 21 of the granular core material 2 at as low a temperature as possible.

Subsequent to step c) and instead of step d), the following three steps can also be carried out:

d') mixing of the calcined particles with a fine $Al_2O_3$ powder and portion-wise solidifying of the batch to green compacts by compression;

e) sintering of the green compacts, in particular at a temperature between 1200 and 1500° C., when NiO is used to make the spinel; and f) reshaping of the sintered product to an end product in that a granulate-like spray powder is produced by crushing which can be used for a thermal spraying method.

The following alternative of the method is also possible:

a) coating of the granular core particle 2 by application of metallic skins by an electrochemical, chemical or physical process (CVD or PVD), with the metal of the skin forming the precursor 22' of the intermediate phase in oxidized form;

b) oxidizing the metal of the skins to form the precursor material 22', with the intermediate phase being able to be produced at least in part subsequently by means of a treatment at an elevated temperature;

c) sintering of the coated granular core particles 2, in particular at a temperature between 1200 and 1500° C., when NiO is used for the manufacture of the spinel, with the sintering being able to take place at and/or after a thermal spraying of the abradable.

To produce the abradable on a substrate—e.g. on an inner surface of the housing of the flow machine in accordance with the invention—the coated granular core particles 2 can be applied by means of a thermal spraying method, for example by means of flame spraying or APS "atmospheric plasma spraying". To obtain a high porosity of the abradable, coating is advantageously carried out by means of flame spraying, since in this process the particles 2 impact on the substrate with a much smaller kinetic energy (factor 0.1 to 0.01) than in the APS process. The forming of the intermediate phase can result by the thermal effect in flame spraying. A granulate can also be used in the thermal spraying method instead of a spray powder, which is composed of loose particles 2, with the individual granulate particles being sintered together in each case from a plurality of granular core particles 2, thereby forming the structure of the composite 1.

In the flow machine in accordance with the invention, vane tips of a rotor can be unarmored. They can also carry a coating whose melting point lies at least 100 K above that of the intermediate phase. At a sufficiently high melting point, practically no material is removed from the vane tip on frictional contact with the abradable, but only from the abradable.

Partly stabilized or fully stabilized zirconium oxide (YSZ) can also be used as the ceramic material 21 for the granular core particles. Further examples for the coating material are: $La_2O_3$, MgO, mullite ($3Al_2O_3.2SiO_2$) and perovskite.

The materials produced with the methods in accordance with the invention can also be used as materials for TBCs. Since a TBC has a different function from an abradable and is exposed to larger temperature gradients, the materials provided for abradables are, however, not ideally formed with respect to a use for TBCs.

The invention claimed is:

1. A flow machine with an abradable of a particle composite material which contains granular core particles of ceramic material whose surfaces carry functional layers, wherein these layers form an intermediate phase of the composite which is stable at a high operating temperature, the intermediate phase being produced in situ on the particle surfaces at least in part by a chemical reaction of a precursor material and material of the granular core particles, wherein bonds are formed between the granular core particles arranged in a porous composite by the intermediate phase and these bonds have a breaking characteristic of abradables, and wherein the granular core particles are coated with a mixture of the precursor material and ceramic material prior to a formation of the composite, with the precursor material and the ceramic material consisting of fine-grain particles whose diameters are smaller than 1 µm.

2. A flow machine in accordance with claim 1, characterized in that the granular core particle contains, at least in a layer at its surface, aluminum oxide $Al_2O_3$ as a main component—more than 50 volume percent; in that the precursor material contains an oxide of a metal Me—where Me=Ni, Mg, Mn or La—and in that the intermediate phase is produced at least in part from $Al_2O_3$ and the metal oxide by the said reaction in which a spinel $MeAl_2O_4$ is created as the reaction product.

3. A flow machine in accordance with claim 1, characterized in that grinding grains are used as the granular core particles and the grinding grains are larger than 50 and smaller than 200 µm, with the diameters of the granular core particles having values in the range from approximately 90 to 130 µm.

4. A flow machine in accordance with claim 3 wherein the grinding grains comprise a synthetic corundum.

5. A flow machine in accordance with claim 1, characterized in that the coated granular core particles or a granulate consisting of the composite is applied by one of means of a thermal spraying process, means of APS and means of flame spraying.

6. A flow machine in accordance with claim 1, characterized in that vane tips of a rotor are unarmored or carry a coating whose melting point lies at least 100 K above that of the intermediate phase.

7. A method for the manufacture of a material for a ceramic abradable in a flow machine in accordance with claim 1, including the following steps:
   a) production of an atomizable or sprayable mixture in the form of a slip or of a suspension in which fine-grain particles of the precursor material are dispersed;
   b) coating of the granular core particles by application of the said mixture and subsequent drying of the particles;
   c) calcining the coated granular core particles at a temperature at which the intermediate phase is formed in situ at the surfaces of precursor material and material of the granular core particle; and
   d) sintering of the calcined granular core particles, in particular at a temperature between 1200 and 1500° C. when NiO is used for the manufacture of spinel, with the sintering being able to take place at and/or after a thermal spraying of the abradable.

8. A method in accordance with claim 7, characterized in that, in step a), the fine-grain particles are produced using a mill in a solvent, and the very fine particles are kept dispersed in this solvent.

9. A method according to claim 8 wherein using a mill comprises using an agitating ball mill.

10. A method according to claim 8 wherein the solvent comprises water.

11. A method in accordance with claim 7, characterized in that, in step b), the granular core particles are sprayed in a fluidized state.

12. A method according to claim 11 wherein the core particles are coated in an aerocoating method.

13. A method for the manufacture of a material for a ceramic abradable in a flow machine in accordance with claim 1, including the following steps:
   a) coating of the granular core particles by application of metallic skins by an electrochemical, chemical or physical process, with the metal of the skin forming the precursor material of the intermediate phase in oxidized form;
   b) oxidizing the metal of the skins to form the precursor material, with the intermediate phase being able to be produced at least in part subsequently by means of a treatment at an elevated temperature;
   c) sintering of the coated granular core particles, in particular at a temperature between 1200 and 1500° C., when NiO is used for the manufacture of the spinel, with the sintering being able to take place at and/or after a thermal spraying of the abradable.

* * * * *